J. M. KELLER.
TESTER FOR SPARK PLUGS AND IGNITION APPARATUS.
APPLICATION FILED MAR. 31, 1915.
1,202,532.
Patented Oct. 24, 1916.
2 SHEETS—SHEET 1.
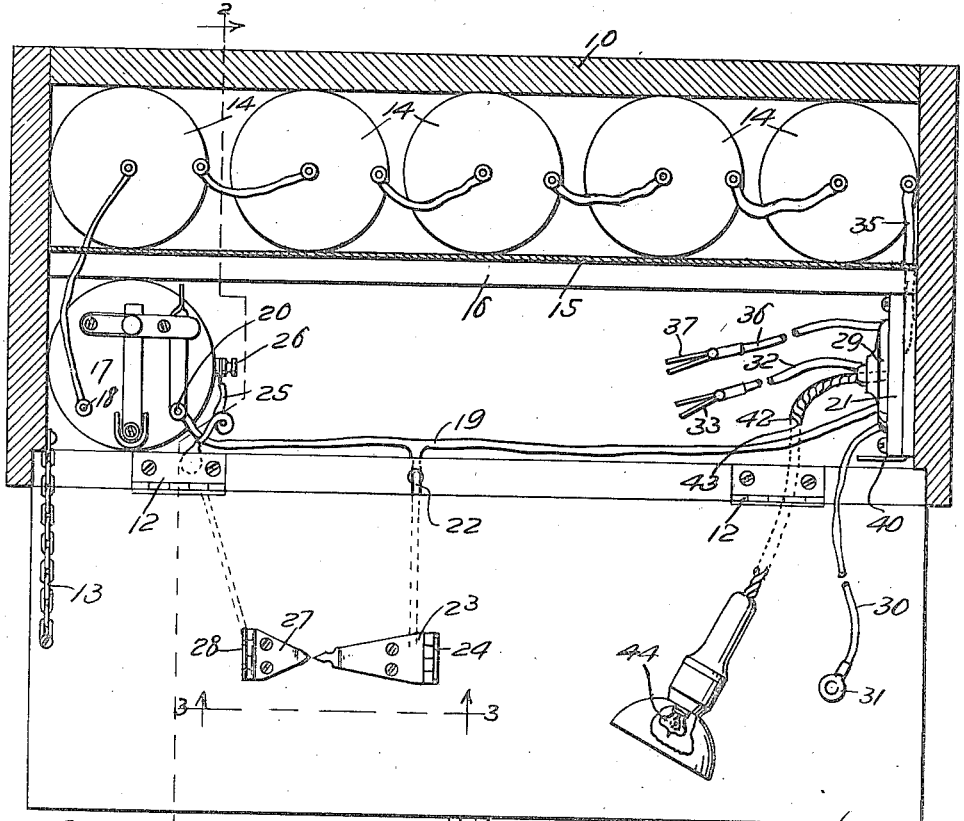
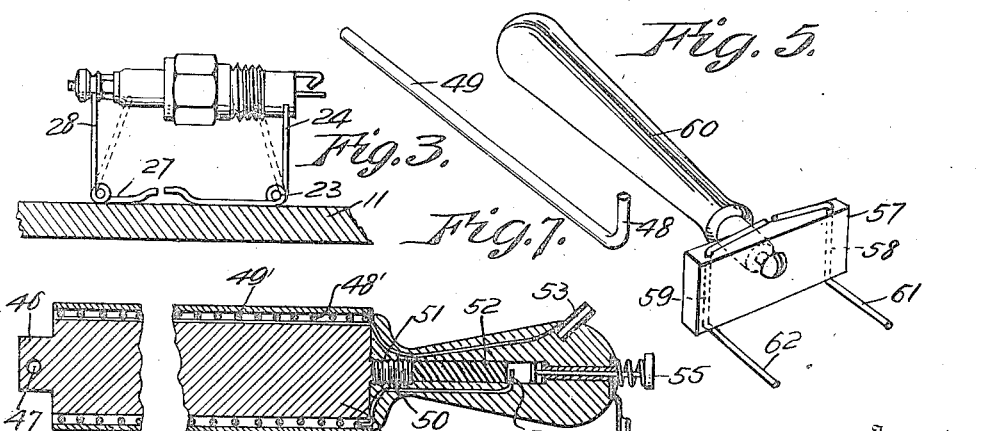
Witnesses
M. J. Pfeifer.
R. E. Barkley.
Inventor
John M. Keller,
By Shanks Ankerman,
Attorney J. M. KELLER.
TESTER FOR SPARK PLUGS AND IGNITION APPARATUS.
APPLICATION FILED MAR. 31, 1915.
1,202,532.
Patented Oct. 24, 1916.
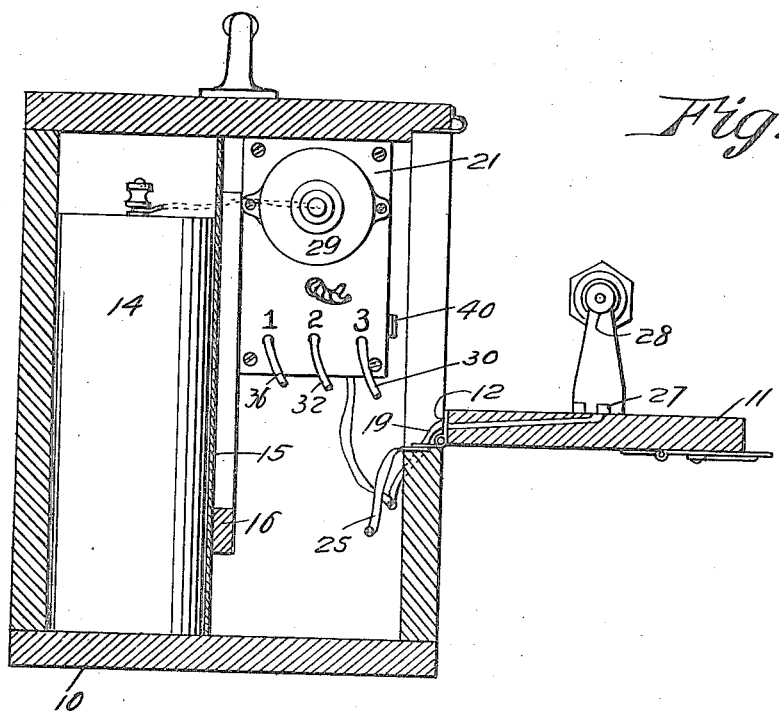
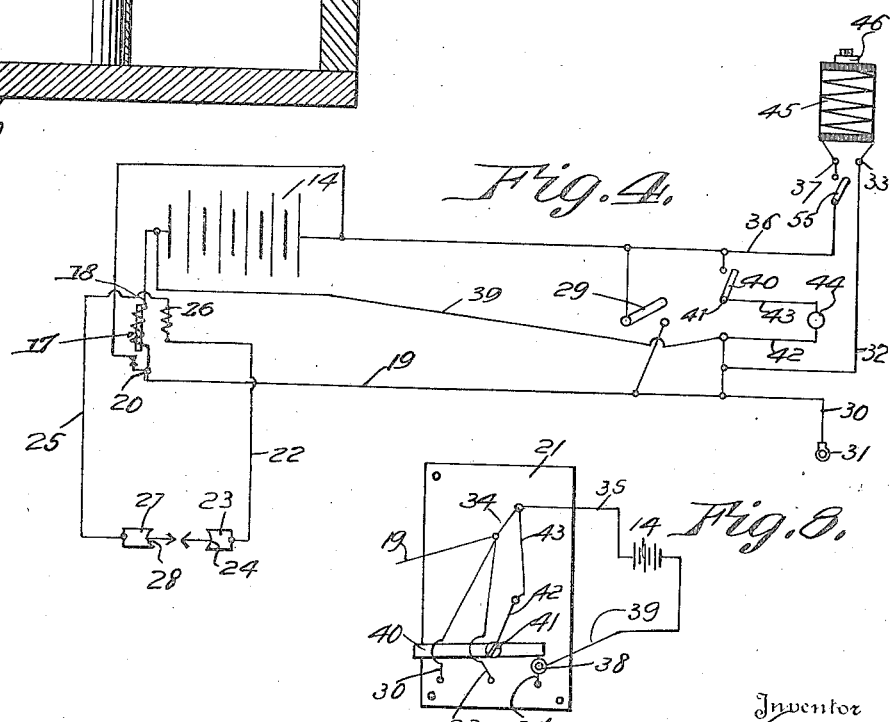

UNITED STATES PATENT OFFICE.

JOHN M. KELLER, OF NAPPANEE, INDIANA.

TESTER FOR SPARK-PLUGS AND IGNITION APPARATUS.

1,202,532.  Specification of Letters Patent. Patented Oct. 24, 1916.

Application filed March 31, 1915. Serial No. 18,329.

*To all whom it may concern:*

Be it known that I, JOHN M. KELLER, a citizen of the United States of America, and resident of Nappanee, in the county of Elkhart and State of Indiana, have invented certain new and useful Improvements in Testers for Spark-Plugs and Ignition Apparatus, of which the following is a specification.

This invention relates to electricity in its general application and particularly to testing implements or apparatus.

An object of this invention is to provide novel means for testing spark plugs and the ignition circuits of internal combustion engines or the like and, furthermore, to provide a magnet adapted to be put in circuit with the source of electricity utilized for testing spark plugs, the said magnet being capable of lifting valves and other metallic parts of motors, automobiles or other machinery, the said magnet being furthermore provided with an adjustable extension having the power of lifting metallic parts and capable of use for removing metallic deposits from casings or other parts of machinery, the said invention having been found effective for the removal of gear cuttings or metallic flakes in the lubricating greases in gear boxes.

A further object of this invention is to provide novel means for determining the condition of the spark producing coils and the sufficiency of the current of electricity delivered from the source of electricity as from the magnet or batteries constituting the sources of electricity in automobiles and the like, the said invention further contemplating the provision of means for furnishing current to an electric lamp, all of which may be contained within a case readily transported for use at a remote distance from a garage or workshop, thus enabling an automobile repair man or an owner of a car to quickly detect defects in the spark plugs or ignition system of automobile or other motors.

With the foregoing and other objects in view, the invention consists in the details of construction and in the arrangement and combination of parts to be hereinafter more fully set forth and claimed.

In describing the invention in detail, reference will be had to the accompanying drawings forming part of this specification, wherein like characters denote corresponding parts in the several views, and in which—

Figure 1 illustrates a sectional view of the container and a plan view of the internal mechanism thereof with the door or cover of the casing opened; Fig. 2 illustrates a sectional view on a line corresponding with the line 2—2 of Fig. 1; Fig. 3 illustrates a sectional view on a line 3—3 of Fig. 1, but showing only the supports for the spark plugs; Fig. 4 illustrates a diagrammatic view of the wiring for the circuits; Fig. 5 illustrates a perspective view of a current testing implement for the distributer or high tension wire; Fig. 6 illustrates a sectional view of the magnet; Fig. 7 illustrates a perspective view of the magnet extension; and Fig. 8 illustrates a detail view of the switch board.

In these drawings 10 denotes the container or casing having its front side provided with a door or closure 11 secured to the casing by hinges such as 12, so that it may swing down to an angle of about 90° forming a shelf, the said closure being held in the position shown in Fig. 2 by supports 13 here shown as comprising chains, although the means for holding the closure in such position may be of any construction.

The casing has a source of electricity such as the ordinary dry cells 14, held back of a partition 15, the said partition being secured in place by a bar 16 pivoted to the partition intermediate its length and having its ends frictionally engaging the ends of the casing with sufficient pressure to retain the partition in place. The partition may therefore, be readily displaced for the removal and replacement of the cells constituting the battery or source of electricity.

The casing is supplied with a vibrating coil 17 and a conductor extends from one pole of the source of electricity to the terminal 18 of the vibrator and a conductor 19 leads from the terminal 20 of the vibrating coil to a switchboard 21, the said conductor 19 having a shunt wire 22 leading to and communicating with the base 23 of a spark plug saddle or support 24, which saddle is hinged to the base so as to be adjusted to different positions as shown in Fig. 3 for the purpose of supporting spark plugs of different lengths. The high tension wire 25 leading from the terminal 26 of the vibrating coil is connected to the base 27 of a saddle 28 which latter saddle is likewise hinged to its base so that it may be adjustable with respect to the other saddle for the purpose stated. The two posts 23 and 27 are shown as secured on the closure 11 and their adjacent ends are tapered and preferably terminate in points which are separated to the desired distance to form a spark gap across which sparks will jump from one point to the other when the current is of such strength as to overcome the resistance of the air gap between these points. The purpose of the arrangement of parts just stated is two fold, in that spark plugs may be tested by being supported thereon and when the vibrator is energized, sparks will be displayed at the spark gap of the spark plug if the said spark plug is not shorted and in effective condition in so far as the insulations and conductors are concerned. The fact that the bases 23 and 27 are in circuit with the source of electricity and the vibrator, the sparks which pass between the points of the bases when the spark plug is removed from the saddles thereof, determine the condition of the ignition system in so far as the circuit and its strength is concerned. If there is a break in the circuit, there would be no spark between the points of the bases whereas if the source of electricity was not of the required strength or if the vibrator coil were out of condition, the intensity of the spark would be diminished, although a diminished spark is usually the result of diminished current supply.

The conductor 19 extends back of the face plate of the switch board 21 and is secured to the binding post of the push button or switch 29 and a conductor 30 is connected to the same binding post or forms a continuation of the conductor 19, said conductor 30 having a terminal loop 31 for a purpose to be presently explained.

The aperture 2 of the switch board has a conductor 32 extending through it and is provided with a friction plug 33 adapted to fit in a terminal socket to be presently explained, the said conductor 32 being secured to a terminal post 34 on the back of the switch board to which a conductor 35 which leads from one pole of the battery is also connected. The aperture 1 in the switch has a conductor 36 extending through it and the conductor 36 has a friction plug or other terminal 37 for a purpose to be presently explained. The end of the conductor 36 back of the switch, is connected to a terminal post 38 to which is also connected a conductor 39 leading from a pole of the battery. It will be seen from an inspection of the drawing and from the foregoing description, therefore, that the conductors 32 and 36 are electrically connected direct to the two poles of the battery and when the terminals 33 and 37 are connected together or are in circuit, current is established from the batteries through these terminals.

A switch arm 40 is pivoted on a binding post 41 and the switch arm is in such position as to be movable into contact with the binding post or terminal post 38. There is a conductor 42 connected to the post on which the switch arm is pivoted and a conductor 43 is connected to the post which is in direct communication with one pole of the battery, the said conductors 42 and 43 leading to a lamp socket or fixture 44 so that when the switch arm is moved to contact with the terminal post 38, circuit is established through the lamp and the same is illuminated.

Heretofore, I have referred to the magnet and its uses and in Fig. 6, I have illustrated the construction of the said magnet. It is illustrated as having a core 45 reduced at one end as shown at 46 and this reduced end has a flat surface which constitutes the lifting surface or contacting surface of the magnet. It is in the nature of a lug and it has an aperture 47 in which the angular end 48 of an extension magnet 49 is pivotally mounted so that it may oscillate from side to side to afford an adjustment whereby the extension magnet may be inserted in narrow recesses or cavities in mechanical devices, such as gear casings. As I have heretofore stated, this extension magnet may be utilized for removing metallic deposits, such as gear teeth, nuts or other metallic parts which may be dislodged from their normal locations and find their way into the grease or lubricant used in machinery.

The core 45 has a winding 48 and a case 49 surrounding the said coil. The core 45 is further provided with a threaded extension 50 which engages threads 51 in the socket of the handle 52, it being shown in Fig. 6 that one end of the wire constituting the winding 48 leads to a terminal socket 53 and that another end of the wire constituting the winding 48 leads to a switch terminal 54 or switch 55 which is slidable in the handle and is adapted to contact with the terminal 54. The switch 55 is further provided with a terminal socket 56 and it is the purpose of the inventor that the terminal sockets 53 and 56 receive the terminal plugs 33 and 37 so that the magnet can be energized by establishing electrical connection through the winding of the magnet when the switch 55 is closed.

The instrument which is used in connection with the spark plug for shorting the circuit and determining the efficiency of the distributer and high tension wire circuit comprises a body 57 preferably of insulation having apertures 58 and 59 therethrough and a suitable handle 60. Wire conductors 61 and 62 extend through the apertures 58 and 59 respectively and are preferably in such spaced relation to each other as to contact the body of the plug which is the ground and the high tension terminal. The opposite ends of the conductors 61 and 62 are bent to lie approximately parallel with the edge of the body 57 and terminate in such relation to each other as to form a spark gap, across which sparks will jump when the opposite ends are applied to the spark plug in the manner stated, provided the ignition system is delivering a spark of such intensity as to overcome the air in the spark gap and failing to so deliver, will be evidence of the impaired condition of such parts of an ignition system.

From the foregoing description of the construction and operation of the parts of the apparatus, it will be seen that the self-contained case is of great utility in locating so-called "trouble" in explosive engines and that when possessed of such an equipment, one may determine or locate the defects in ignition systems and the device is furthermore of utility in that it provides for the employment of the magnet with the various uses ascribed to it.

When the apparatus is to be used for testing spark plugs, the spark plug may be placed on the saddles with the top of the plug to the left and by operating the push button, circuit is established through the vibrating coil and through the spark plug. If the spark gap of the spark plug is of proper width and the resistance thereof is less than the resistance between the points of the bases of the saddles, the spark at the spark gap of the spark plug will show it to be effective, provided of course the source of electricity is in good order and the circuits are uninterrupted. When testing the high tension wire, the ends of the wires 61 and 62 are placed on the spark plug while the engine is running and if there is no spark in the spark gap of the tester, there is a shorted or broken conductor or wire.

When the electric lamp is to be lighted, it is only necessary to push the switch lever for establishing a circuit in the manner stated. The manner of supplying current to the magnet has been heretofore stated and need not be repeated.

For the purpose of starting a motor when the batteries which are a part of the installation of the motor are exhausted, current may be temporarily supplied from the battery of this apparatus by applying the terminals 33 and 37 to the poles of the battery connection which constitutes a part of the installation.

In testing the wiring, coils, magnetos and conductors, the terminal 31 and the terminal 33 may be brought into contact with the ends of the conductors or at intermediate points in its length and if the conductor is capable of carrying a current, a current would be established therethrough with the result that the vibrator would operate and sparks would be visible at the spark gap between the bases 23 and 27, whereas if the conductor being tested was imperfect, the degree of imperfection would be denoted by the density of the spark at the spark gap mentioned, whereas, if there were no spark, it would indicate that the conductor was incapable of allowing any current to pass through it. So too, if a winding of a non-vibrating coil were shorted and the current were not going through the winding, the current which would be established through a perfect conductor would create a spark at the spark gap just described, whereas the imperfect conductor, due to the shorting of the vibrating coil would divert the flow of current to such an extent that the spark at the spark gap of the apparatus would not be normal, so indicating imperfection in the winding. Of course, this apparatus is also capable of many other uses and it is not the purpose of the inventor to be limited with respect to the application of the device in its practical employment.

I claim:—

1. In a testing apparatus, a source of electricity, a vibrator, saddles adapted to support spark plugs, said saddles having bases in spaced relation to each other to form a spark gap therebetween, conductors of electricity leading to said bases, and means for establishing a circuit through the source of electricity and the vibrator to said bases.

2. In a testing apparatus, a source of electricity, adjustable supports for spark plugs, said supports being in spaced relation and adapted to have a spark gap therebetween, means for establishing a circuit of electricity through said supports, and a vibrator in circuit therewith.

In testimony whereof I hereunto affix my signature in the presence of two witnesses.

JOHN M. KELLER.

Witnesses:
J. Ross Calhoun,
Lottie E. Barkley.